Figure 1:
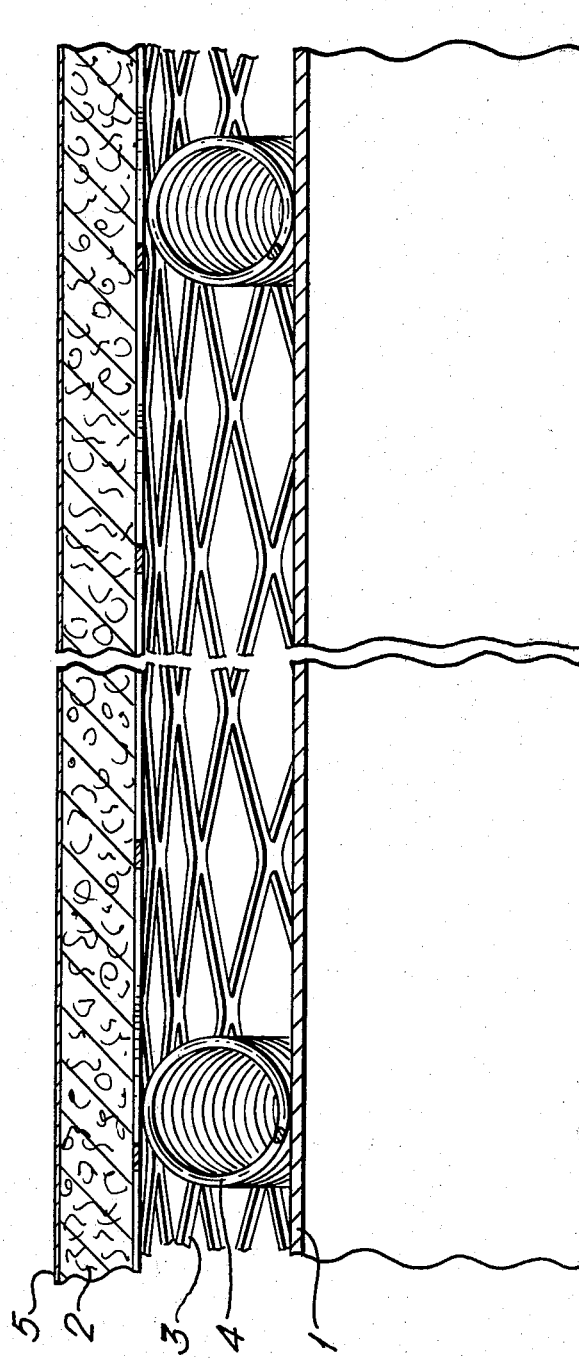

United States Patent [19]

Erskine

[11] 4,310,068

[45] Jan. 12, 1982

[54] ACOUSTICALLY LAGGED STRUCTURE

[75] Inventor: James B. Erskine, Stockton-on-Tees, England

[73] Assignee: Imperial Chemical Industries Limited, London, England

[21] Appl. No.: 117,215

[22] Filed: Jan. 31, 1980

[30] Foreign Application Priority Data

Feb. 28, 1979 [GB] United Kingdom ............... 07086/79

[51] Int. Cl.³ .............................................. E04B 1/82
[52] U.S. Cl. .................................... 181/290; 181/224
[58] Field of Search ............... 181/205, 207, 208, 243, 181/227, 244, 247, 252, 256, 284, 290, 224, 282, 286, 291, 292; 285/47, 138

[56] References Cited

U.S. PATENT DOCUMENTS

| | | | |
|---|---|---|---|
| 2,514,170 | 7/1950 | Walter et al. | 181/207 |
| 2,583,366 | 1/1952 | Engels | 181/252 |
| 2,826,261 | 3/1958 | Eckel | 181/252 |
| 3,804,438 | 4/1974 | Humphries et al. | 285/47 |

FOREIGN PATENT DOCUMENTS 563110 7/1944 United Kingdom ................ 181/252
1420356 1/1976 United Kingdom ................ 181/256

OTHER PUBLICATIONS

*Sound-Proof Method for Sound Generator,* Abstract of Japanese Kokgin 53-12830 vol. 3, No. 1, Jan. 1979, pp. 128-182.

*Primary Examiner*—L. T. Hix
*Assistant Examiner*—Benjamin R. Fuller
*Attorney, Agent, or Firm*—Cushman, Darby & Cushman

[57] ABSTRACT

An acoustically lagged structure with improved low frequency attenuation has acoustic lagging in the form of a fibrous blanket provided with an external cladding skin held in spaced relationship from the component, e.g. pipe, to be lagged by spacing members. The blanket and/or spacing members are resilient to avoid mechanical close coupling of the skin and component.

10 Claims, 2 Drawing Figures

ACOUSTICALLY LAGGED STRUCTURE

This invention relates to an acoustically lagged structure.

It is often desirable to lag pipes, ducts, vessels, machinery, and other items of equipment to attenuate noise therefrom. Indeed such lagging is often necessary to comply with factory or other environmental regulations.

Blankets of fibrous material wrapped around, or fastened on, such pieces of equipment have in the past been used to provide some sound attenuation. Usually a cladding of a skin of a suitable material, eg metal, is provided over the blanket to hold it in place and to provide protection from physical damage. Often the cladding is mechanically close coupled to the component to be lagged by virtue of the means, eg pins, used to locate and fasten the blanket and cladding to the component.

While such blankets may effectively attenuate high frequency sounds, the attenuation of frequencies below 1000 Hz is often poor. This is because the thickness of the blanket is generally only a small fraction of the sound wavelength and the vibration of the component is transmitted through the blanket causing the cladding to act as a secondary noise source.

While attenuation of the lower frequency sounds can be achieved by using a greatly increased blanket thickness, such systems are expensive and bulky, and moreover increase the mechanical loads on the component and any supports therefor.

According to the present invention we provide an acoustically lagged structure comprising a component to be lagged, a blanket of fibrous sound absorbing material supported by said component and spaced therefrom by spacing members, and a skin of a material having a greater density than said blanket on the surface of the blanket remote from said component, said spacing members and/or said blanket being resilient whereby said skin is not close coupled to said component.

To avoid the skin being mechanically close coupled to the component, it is also necessary that the skin is not directly fastened to the component, or to the spacing members where these are not resilient.

In the invention there is thus provided an air gap between the component and the blanket, the air gap only being interrupted by the spacing members positioned at intervals over the surface to be lagged of the component. It is preferred that the volume occupied by the spacing members is less than one tenth of the total space between the component and the blanket. The space between adjacent spacing members is preferably from 0.5 to 2 meters, particularly 0.75 to 1.75 meters.

The blanket may totally enclose the component or may only cover part thereof.

The fibrous blanket is preferably formed from an inorganic fibrous material, such as glass or mineral wool, particularly where the component may attain elevated temperatures in use. However in other cases, natural or synthetic organic fibrous materials may be employed. The blanket may also serve as a heat insulant. The blanket is generally resilient and, where it is not self supporting, a support eg of expanded metal may be employed on the surface of the blanket nearer to the component. Such a support is itself preferably resilient.

The blanket, which preferably has a bulk density of 0.05 to 0.25, particularly 0.1 to 0.16, g cm$^{-3}$, preferably has a thickness of 2 to 10 cm. The blanket is preferably spaced from the component by a distance of 1.5 to 15 cm, particularly 2.5 to 10 cm.

The spacing members may be made of any suitable material and need not be resilient, except where the blanket is not resilient. A convenient form of spacer is a collar formed from a metal coil spring. Examples of alternative spacer materials include impregnated fibrous materials, sheet metal, or rubber where the rubber is capable of withstanding the temperatures which the component may attain. In some cases the spacers may be made integrally with the blanket, but such a system is less preferred as it is liable to be more expensive and also is liable to be less resilient, and hence give rise to mechanical close coupling of the cladding skin to the component, in order to hold the blanket in spaced relationship from the component.

The cladding skin acts as a protective layer on the exposed surface of the blanket. The skin is made of a denser material than the blanket and may be a plastics material, where the latter can withstand the temperatures to which it may be subjected. Preferred skin materials are however sheet metals, particularly aluminium or steel.

The invention is of particular merit in lagging pipes, vessels and machinery casings eg fan shrouds. The invention is of particular utility in lagging pipes and ducts having a maximum cross sectional dimension of at least 10 cm.

The lagging may be constructed in any suitable manner. For example it may be constructed in sections of eg an expanded metal layer, blanket, and cladding skin formed to the desired shape and held together by suitable means, such as pins extending from the expanded metal layer through the blanket to the skin; the sections may then be assembled on to the component on to which the spacing members have been positioned, and fastened if necessary, and held in place by, eg strapping. Alternatively the lagging may be built up by positioning the spacing members on the component, applying the support, if any, over the spacing members and then applying the blanket and skin.

Figure 2:
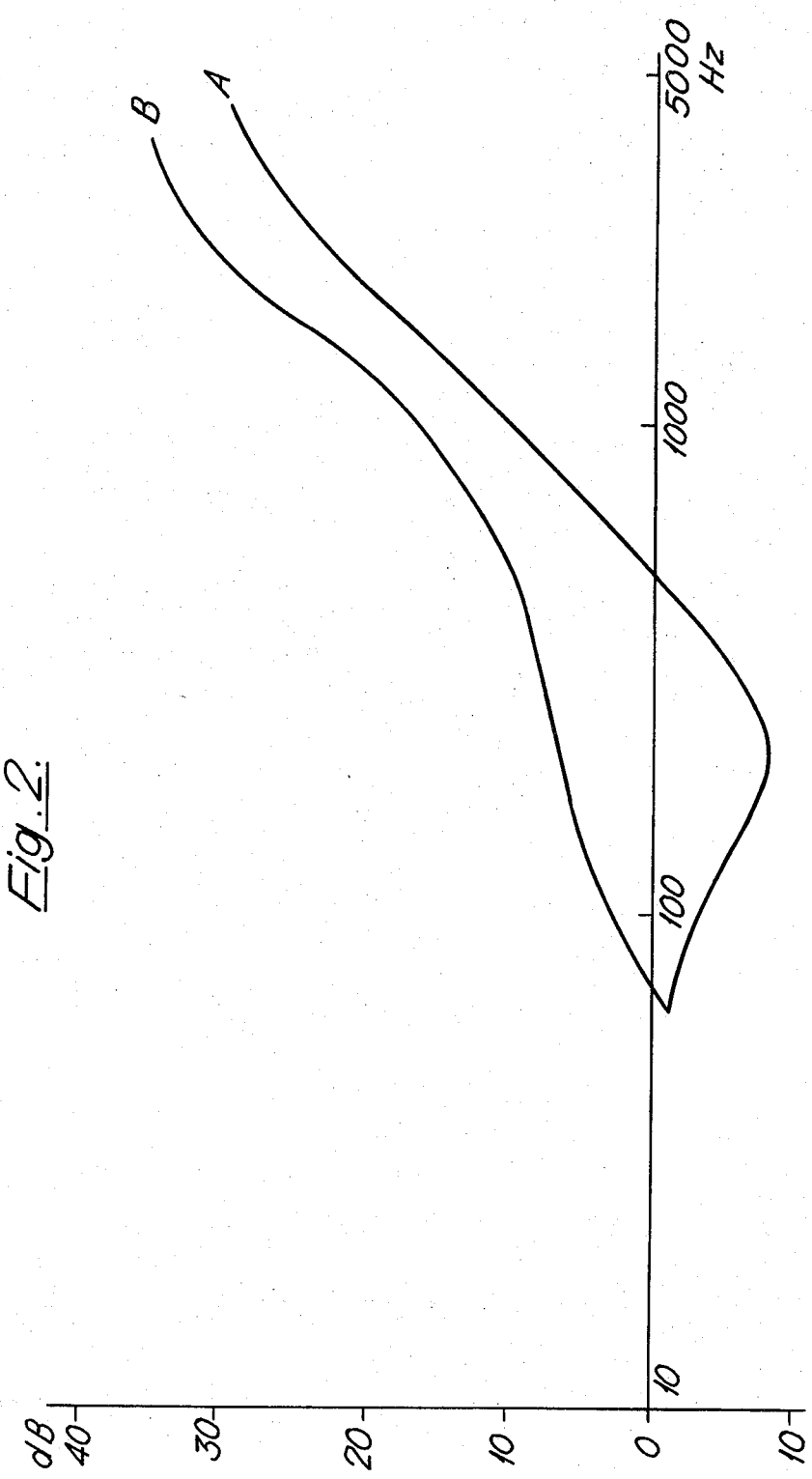

The invention is illustrated by reference to the accompanying drawings wherein:

FIG. 1 is a longitudinal section of a pipe lagged in accordance with the invention, FIG. 2 is a graph of the attenuation plotted against frequency for particular constructions.

In FIG. 1 a pipe 1 is provided with a lagging comprising a blanket 2 of mineral wool supported on an expanded metal layer 3 maintained in spaced relationship from the surface of the pipe 1 by metal coil springs 4 wrapped around the pipe surface. The coil springs have a torroidal form, simply achieved by connecting together the ends of the coil spring around the pipe. The blanket 2 is provided on its external surface with a metal skin 5 to protect the blanket from damage.

To illustrate the invention, the acoustic attenuation was compared between a conventional lagging and lagging in accordance with the invention. A steel pipe of 19 cm. inside diameter and 20.3 cm outside diameter was conventionally lagged with a blanket of mineral wool of thickness 2.5 cm. and bulk density 0.13 g cm$^{-3}$ wrapped directly on to the pipe. The fibre blanket was held in place and protected by a skin formed from aluminium sheet of thickness 0.07 cm.

The attenuation was assessed by the following procedure. A loudspeaker was mounted in one end of the pipe and sound at a given frequency was produced by applying a suitable signal to the loudspeaker at a power of 15 watts. The ends of the pipe, ie behind the loudspeaker and the end remote therefrom, were plugged with sound absorbing material. The sound emitted by the pipe was picked up by an unidirectional microphone positioned 1 m from the pipe surface. The attenuation was determined by measuring the signal picked up by the microphone with and without the lagging on the pipe.

The attenuation curve is indicated in FIG. 2 as line A.

This procedure was repeated using lagging in accordance with the invention as shown in FIG. 1. The blanket of thickness 2.5 cm having an aluminium cladding of thickness 0.07 cm was supported on an expanded metal mesh of thickness 3 mm spaced 5 cm from the pipe surface by means of coil springs of cross sectional diameter 5 cm spaced along the pipe length at intervals of 1 m.

The attenuation curve is indicated in FIG. 2 by line B. It is seen that the lagged structure of the invention had an overall superior attenuation, and the attenuation at frequencies below 1000 Hz is particularly improved compared to the conventional lagging. The attenuation given by the structure of the invention was also superior to that given by a blanket of thickness 7.5 cm wrapped directly round the pipe.

I claim:

1. An acoustically lagged structure comprising an imperforate component that is to be lagged, a blanket of fibrous sound absorbing material supported by said component and spaced therefrom by a plurality of spacing members disposed at intervals along the length of the component, and a skin of material having a greater density than said blanket on the surface of the blanket remote from said component, at least one of (a) said spacing members and (b) said blanket being resilient, and there being no direct fastening of the skin to the component or to the spacing members where the latter are not resilient, so that the skin is not close coupled to said component.

2. A structure according to claim 1 wherein the volume of the spacing members is less than 10% of the total space between the component and the blanket.

3. A structure according to claim 1 wherein the spacing members are spaced apart by a distance of between 0.5 and 2 meters.

4. A structure according to claim 1 wherein the spacers are collars around the component and comprise torroidal members formed by connecting together the ends of a coil spring.

5. A structure according to claim 1 wherein the spacers hold the blanket a distance of between 1.5 and 15 cm from the surface of the component.

6. A structure according to claim 1 wherein the blanket is not self-supporting and a support therefor is provided on the surface of the blanket nearer the component.

7. A structure according to claim 6 wherein the support is resilient.

8. A structure according to claim 7 wherein the support comprises a sheet of expanded metal.

9. A structure according to claim 1 in which the blanket has a thickness of between 2 and 10 cm.

10. A structure according to claim 1 wherein the skin is metal.

* * * * *